Dec. 23, 1958

L. W. PARKER 2,865,986

HIGH POWER FREQUENCY DISCRIMINATOR

Filed Aug. 3, 1953

2 Sheets-Sheet 1

INVENTOR
LOUIS W. PARKER

BY Moore & Hall

ATTORNEYS

Dec. 23, 1958 L. W. PARKER 2,865,986

HIGH POWER FREQUENCY DISCRIMINATOR

Filed Aug. 3, 1953

2 Sheets-Sheet 2

INVENTOR

LOUIS W. PARKER

BY *Moore and Hall*

ATTORNEYS

United States Patent Office 2,865,986

Patented Dec. 23, 1958

2,865,986

HIGH POWER FREQUENCY DISCRIMINATOR

Louis W. Parker, Great Neck, N. Y.

Application August 3, 1953, Serial No. 371,958

21 Claims. (Cl. 178—5.8)

This invention relates to discriminators for frequency modulation receivers, but is herein described as a discriminator in the frequency modulated sound channel of a television receiver. The invention has both broad and narrow aspects in that while it may be broadly applied to essentially any frequency modulation receiver, it achieves peculiar and striking advantages when used in an inter-carrier television receiver. This invention is a continuation in part of my prior copending application Serial No. 252,783, filed October 23, 1951, entitled Inter-carrier Television Receiver, now abandoned. The present application describes and claims some of the matter contained in that application, as well as a number of improvements on the devices shown in that application.

The invention is more particularly concerned with frequency variation response circuits or discriminators of the well-known type utilizing an electron discharge device having a pair of control electrodes or grids, one of said grids being excited by a variable frequency (FM) input signal potential and the other being excited by said signal via the electron stream or discharge current at a phase varying proportionally to the frequency deviations of said input signal in accordance with an audio or other modulating signal. As a result, anode current fluctuations are set up according to said frequency deviations which may serve to control a loudspeaker or other translating device.

In known discriminators of this type, one control grid, known as the signal or input grid, is located near the cathode and the other control grid, known as the quadrature grid, is located near the anode, the grids being separated from one another by a positively biased screen or accelerating grid, to produce a concentrated space charge or virtual cathode in the space between the accelerating and quadrature grids, said space charge fluctuating in density and phase in accordance with the signal potential applied to the input grid and causing a signal or control potential to be induced upon said quadrature grid by space charge coupling or electrostatic induction.

With the device of the prior art it has been necessary to use more than one tube in order to secure necessary audio output, whereas it is an object of the present invention to provide a device in which the limiting, discriminating, and audio amplification functions are all performed in a single tube.

It is a further object of the invention to provide a device for limiting, discriminating and amplifying which is simpler, lower in cost, and less critical in adjustment, than prior devices for performing this function.

It is a further object of the invention to reduce the cost of an intercarrier television receiver by providing a single tube and its circuits so arranged that it not only acts as a limiter and a discriminator but also supplies sufficient sound power for satisfactory loud speaker operation.

It is a further object of this invention to provide a new and improved discriminator for frequency modulation receivers.

Other objects and advantages of this invention will appear as this description proceeds.

With the foregoing objects in view, the invention involves principally the provision of means in a frequency discriminator of the general character described, to increase the undistorted anode current flucutations at the modulating signal frequency to such an extent as to provide maximum audio signal output, limited practically only by the current carrying capacity of the tube. This object is achieved principally by a radio frequency feedback from the anode circuit to the quadrature grid circuit, preferably via the inherent capacity between the anode and the quadrature grid, to regenerate the space charge-induced quadrature grid potential, to cause a substantial increase of the anode current fluctuations at modulating frequency due to the combined effect of the signal and quadrature grid potentials on the electron discharge stream. For reasons set forth hereinafter, the quadrature grid preferably has a low amplification factor. According to a preferred embodiment, a certain amount of negative feedback may also be used from the anode circuit upon the quadrature grid circuit, to prevent oscillations and to improve and stabilize the operation of the discriminator.

A further expedient to increase the anode current fluctuations at modulating frequency, according to the invention, consists in developing a modulating signal potential upon or current of the accelerating grid by the proper design of the bypass condenser in the manner described in detail hereafter, whereby to further boost or increase the demodulated power output of the tube.

In my prior U. S. Patent 2,448,908 the basic circuit of an intercarrier television receiver is shown and described and it is understood that the present invention is an improvement on the device of that patent, although in its broader aspects it is applicable to any frequency modulation receiver. I employ a tuner and converter 7, an I. F. amplifier 8, and an amplitude detector 9. These stages are arranged to amplify the video and sound carriers but in different degrees so that the resulting sound carrier has an amplitude of about 5% of that of the unmodulated image carrier. The sound and image carriers are then heterodyned to produce a new carrier equal to the difference between the carriers, which in the case of present day television practice is 4.5 megacycles. The two carriers are impressed on the control grid of the amplifier tube 10. The devices just described are identical in principle to the intercarrier television receiver of said Patent 2,448,908. It is understood that the entire disclosure of that patent is incorporated herein by reference, the same as though spelled out herein, except for the variations therein shown in Figure 1 and hereinafter described.

Figure 1:
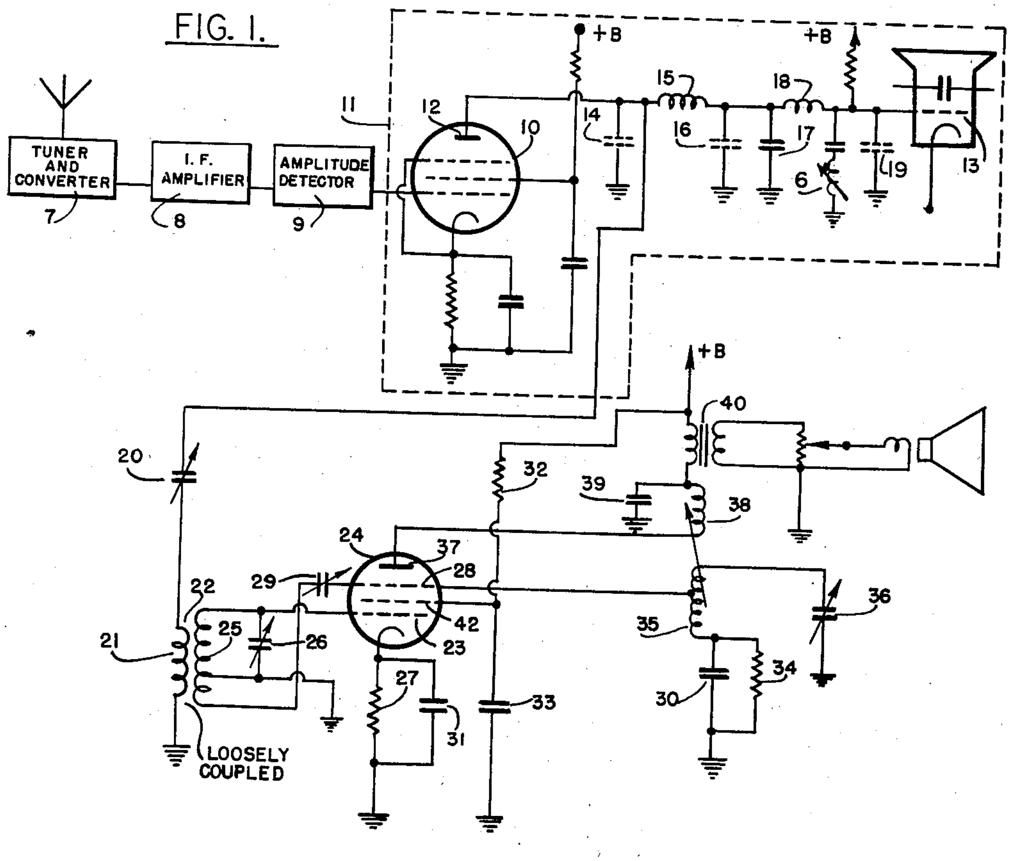
Figure 1 is a schematic diagram of one form of the invention.

As shown in Figure 1, I employ an amplifier 11 which includes a peaking system of the type shown in my prior copending application Serial No. 321,582, filed November 20, 1952, entitled Intercarrier Television Receiver. This particular peaking system is a desirable adjunct with the remainder of my new device as it provides about 20 to 30 volts (peak) to the input transformer 21 of my new discriminator. There is sufficient power in the series resonant circuit 20—21 that substantial and adequate grid current is available for pentode 24. The combination of amplifier 11 with the remainder of my circuit, shown in the drawings, is therefore one item of novelty hereinafter claimed.

The anode 12 of the final video amplifier tube 10 feeds video energy to the grid 13 of a conventional cathode ray tube, through a so-called double $\pi$ filter coupling network made up of elements 14, 15, 16, 17, 18 and 19. This network employs two inductors 15 and 18 in series and three condensers 14, 16—17, and 19, the middle one 16—17 of which has double the capacity of the others considered separately. Condensers 14, 16, and 19 are shown in dotted lines as they represent the inherent capacity of the circuit. The cut-off frequency of the filter network is made about four megacycles in order to prevent the 4.5 megacycle sound carrier from passing to the grid 13. The circuit 20, 21, is tuned to 4.5 megacycles and represents a low impedance to the sound carrier signal, but represents a very high impedance to the video signal. Further details of the coaction of peaking system 11 and the series resonant circuit 20—21 are set forth in my aforesaid prior copending application S. N. 321,582, and are incorporated herein by reference the same as though fully described herein. In addition to the circuit described in that reference I found it appropriate to employ series resonance circuit 6 tuned to 4.5 mc., to further reduce the sound signal at the grid of the cathode ray tube.

The operation of the circuit as a limiter and in its function of supplying a high signal potential to the grid 23 of pentode 24 will now be described. The primary and secondary of transformer 22 are loosely coupled, and the secondary 25 together with condenser 26 are tuned to 4.5 megacycles but this tuned circuit passes a wide band, considerably wider than necessary to pass the 25 kilocycle modulation. The grid 23 draws grid current when the peaks of the radio frequency wave are higher than the cathode bias voltage produced across resistor 27. Flow of grid current as aforesaid increases the losses in resonant circuit 25—26 which effectively decreases the Q of this circuit. The lower part of secondary 25 is 180 degrees out of phase from the upper part and is connected to the quadrature grid 28 of pentode 24 through a neutralizing condenser 29. This connection opposes the effect of the interelectrode capacitance between the control grid and the quadrature grid and prevents passage of signal-frequency energy between them. Resistor 27 and condenser 31 provide a self bias for pentode 24, as aforesaid, of about 20 volts.

The quadrature grid 28 is one having relatively wide spacing between its several wires but is otherwise conventional and consequently has a low amplification factor, and makes the plate impedance low.

Resistor 32 and condenser 33 fix the screen grid potential at a level substantially below that of the plate. A reduction of the capacity of condenser 33 to the point where the by-passing is complete for the radio frequency currents involved but insufficient for audio frequency produces an increase in output power for reasons described later. With the type 837 tube, the average D. C. screen current should preferably be about 27 milliamperes, this high value being due mainly to the excessive negative bias of about 120 volts on the quadrature grid 28. The quadrature grid bias is fixed mainly by the resistance of resistor 34, as will be hereinafter described in more detail.

In order that the radio frequency signal on the quadrature grid 28 will normally be ninety degrees out of phase with that on the control grid, a tuned circuit 35, 36 is provided which is tuned very nearly to but preferably slightly different from the center frequency of the signal fed to transformer 22. Since grid 28 has a very low amplification constant the signal potential required by it is high, as for example in the case of the above-mentioned type 837 tube it is well over 100 volts peak. This signal is obtained, in part, by electrostatic induction from the electron stream and the space charge or virtual cathode formed between the screen grid 42 and the quadrature grid 28 and fluctuating in density according to the signal frequency applied to the input grid 23 and, in part, by feedback from the anode 37 via the internal capacity between the anode and grid 28. The anode circuit includes an unbypassed coil or inductor 38 providing appreciable reactance at the signal frequency and causing a high amplitude signal frequency potential to be developed at the anode 37 which produces, by virtue of the coupling between the anode 37 and the grid 28, a high amplitude signal of proper phase in the quadrature circuit. Thus, the inductor 33 causes optimum positive feedback or regeneration between the anode and the quadrature circuit, substantially within the full range of frequency deviation from the center or carrier frequency of the received input signal applied to grid 23. It is clear, therefore, that up to a certain point, increasing the inductance of coil 38 increases the positive feed back (regeneration) and for reasons described later increases the audio output. Any radio frequency energy passing coil 38 is by-passed to ground through condenser 39 and substantially only audio frequency energy flows through the primary of the audio frequency transformer 40.

In the absence of negative feed back from coil 38 to coil 35, it is possible to make coil 38 so large that the potential on anode 37 rises so high that the positive feedback will be so great that the circuit will oscillate. If the inductance of coil 38 is low enough that there are no oscillations, and if there is no negative feed-back, the output will be greater than it would be without coil 38. However, a large and unexpected increase in output results if the inductance of coil 38 is increased far beyond the point where it will cause oscillations (in the absence of negative feed back) and if the coil 38 is then coupled to coil 35 in such phase and to a sufficient extent to just stop the oscillations. In other words the output is far greater when the coil 38 has sufficient inductance to create oscillations in the absence of negative feed-back and is so coupled to coil 35 as to just stop the oscillations, than when there is no negative feedback and the inductance of coil 38 is just below the value that causes oscillations. As noted on the drawing the mutual inductance of coils 35 and 38 is variable in order that the negative feed back may be increased just beyond the point at which the oscillations are stopped.

Figure 2:
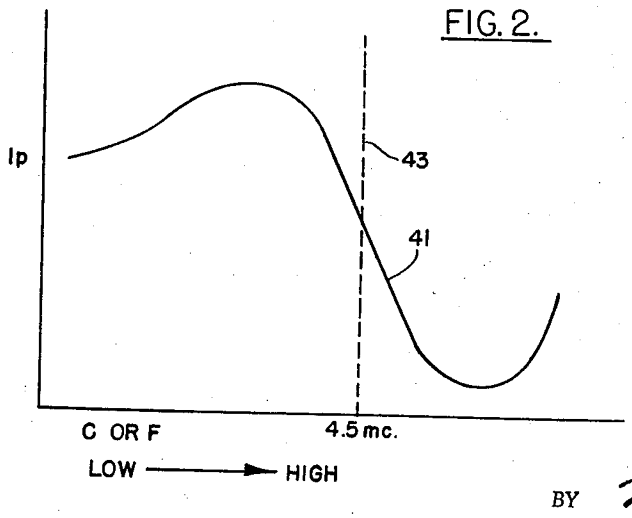
Figure 2 is a curve showing the relationship of the plate current to changes in signal frequency or tuning of the discriminator circuit.

Fig. 2 indicates the variation of the average D. C. plate current with either a fixed setting of resonance circuit 35, 36 and varying the frequency of the signal supplied to the transformer 22 or by fixing the frequency of such signal and varying the capacity of the condenser 36 of the resonance circuit. During these tests a high value of a fixed bias was applied to the grid 28 so as to prevent bias variation from affecting the plate current. There is a wide slope 41 and two narrower slopes on this curve. Frequency discrimination is possible on any of these, but of course the use of the wide slope 41 for this purpose is much preferable. I found that the most practical method of tuning is to place a milliammeter in series with the plate circuit, tune condenser 36 to obtain maximum current, then to obtain minimum. After having established these two points, I tune condenser 36 until a current half way between them on the slope of the curve is obtained. This method of tuning gives good results even when the signal used is frequency modulated, which is a considerable advantage, eliminating the need of a CW signal for test. During this test the suppressor bias must be maintained fairly constant.

I have also found that tuning resonance circuit 35 exactly on resonance gives less output with more distortion than if I tuned it slightly off resonance. For this reason I prefer to omit any observation of resonance when tuning and use the above method of observing plate current.

A fixed negative bias of 100 to 120 volts or even higher is preferable for the grid 28 when using a tube such as the type 837; but if this is not available, a cathode bias of about 20 volts, together with a high resistance, grid-leak and grid-condenser combination gives satisfactory results by rectifying some of the R. F. voltage at the grid 28 and generating negative bias which together with the cathode bias is nearly equal to the peak R. F. voltage. If the input signal is removed, the grid leak bias disappears but due to the remaining 20 volts of cathode bias no harm is done to the tube.

I found that unless a tube of very low plate impedance is used, no transformer of reasonable size and cost can match it. This is due to the fact that the plate current is made up of pulses, which are integrated by condenser 39 at the plate. The condenser then discharges through the audio frequency transformer 40. The charging period being shorter than the discharge period, it is necessary to use a much higher impedance through which to accomplish this discharge. Due to the narrowness of the plate pulse it is also necessary that it be of comparatively high current if normal amount of power is to be delivered to the speaker. Since the grid 28 is to operate substantially class A (i. e., with zero or low grid current because otherwise an undue amount of power would be required by it) it is necessary that the second section of pentode 24 (the section between the screen and plate) be in effect a high current low mu triode. This results in low plate impedance and high peak currents. The plate impedance and plate current, however, appear normal to transformer 40 for the reason given above. In the case of the type 837 tube the best transformer impedance value to match the tube is about 9,000 ohms; and the average plate current (at 350 volts plate and 220 volts screen potential) is 25 milliamperes. The average D. C. screen current is about 27 milliamperes, this high value being due mainly to the excessive negative bias on the suppressor (120 volts).

The negative bias and the amplitude of the signal fed to the control grid 23 of pentode 24 is such that the cathode current consists of approximately half sine waves at the intercarrier frequency. The suppressor signal then determines how much of this current passes to the plate rather than being captured by the screen 42. The signal which controls the grid 28 is composed of an intercarrier frequency component and a D. C. negative bias component roughly equal to its peak. This D. C. bias results from the fact that the grid 28 (when it is momentarily positive) draws some grid current which is rectified. The grid current pulses charge condenser 30 which is discharged through resistor 34.

The intercarrier frequency signal at the grid 28 varies rapidly in phase and slightly in amplitude as the modulation varies the frequency about its mean value (for example 4.5 megacycles). The combined effect is to reduce the average plate current below the value it would have with the grid 28 connected to cathode (since the bias causes the grid 28 essentially to swing negative only), and this reduction is a marked function of frequency as indicated in Figure 2. If the circuit 35—36 is tuned, as explained above, to nearly the intercarrier frequency of 4.5 megacycles (line 43 on Figure 2), then as the frequency of the incoming signal varies to one side or the other of line 43, the plate current will be amplitude modulated. If the portion 41 of the curve of Figure 2 is substantially straight, there will be little distortion in the amplitude modulated wave.

As the negative voltage on the grid 28 momentarily drops, the plate current momentarily increases and simultaneously the screen current decreases. To take advantage of the screen current variation I use a low capacity condenser 33 between screen and ground and connect the screen to the plate supply through a resistor 32 as shown on Fig. 1. In this way the screen potential varies at an audio frequency rate. As a result, as the plate current increases according to the modulating signal, the screen potential is increased helping the plate current and, at the same time, increasing the suppressor grid to plate mutual conductance as well as reducing the plate impedance. I found that the improvement due to this simple arrangement in one instance was an increase from 800 milliwatts output to 1200 milliwatts. In addition the average screen potential and dissipation was also reduced.

Figure 3:
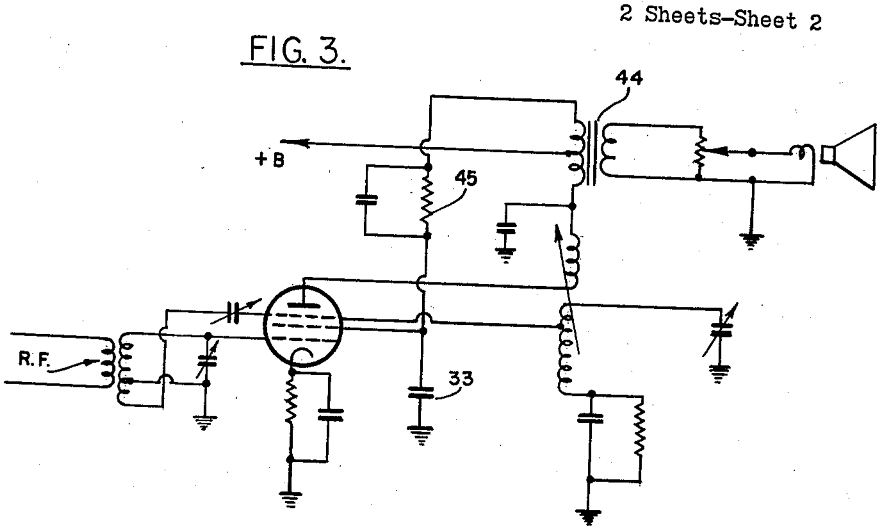
Figure 3 is a schematic diagram of a modified form of the invention.

Another way I found to take advantage of the screen current variation is shown in Fig. 3. In this figure a push pull transformer 44 is used, and the D. C. component is greatly reduced due to the opposing D. C. fields in the push pull primary coil. The power output is also increased since the audio frequency phases are opposite in the plate and screen. Inasmuch as the screen potential is somewhat lower I used in series with it a voltage dropping resistor 45 bridged by a high capacity condenser. There is also an R. F. by-pass condenser 33 functioning the same as the complementary condenser 33 of Figure 1, i. e., condenser 33 causes an increase in the power output in addition to that obtained by the use of transformer 44 because of the effect of the screen voltage on the plate current.

In all the circuits shown I used neutralization between the first and third grids to eliminate the high radio frequency voltage at the suppressor from affecting the input. This feature is similar to the one in my aforesaid earlier application S. N. 252,783, and may be dispensed with if low interelectrode capacities are used in pentode 24.

In the above description several references were made to the type 837. I did this because most of the tests were conducted with such tube. However this type of tube, while the best available so far, is not the best tube for use in my circuit as described here. A tube particularly designed for my system would differ from the type 837 most notably in construction of the first grid. This grid would better serve the purpose if it had closer spacings and consequently higher degree of control than the type 837, in order to permit better limiter action at lower radio frequency voltages. When a type 837 tube is used the capacity between the pins in the base of the tube to which the first and third grids are respectively connected is undesirably high and may be reduced by removing the pin for the third grid, the wire from that grid being brought out of the side of the tube.

Figures 4, 5:
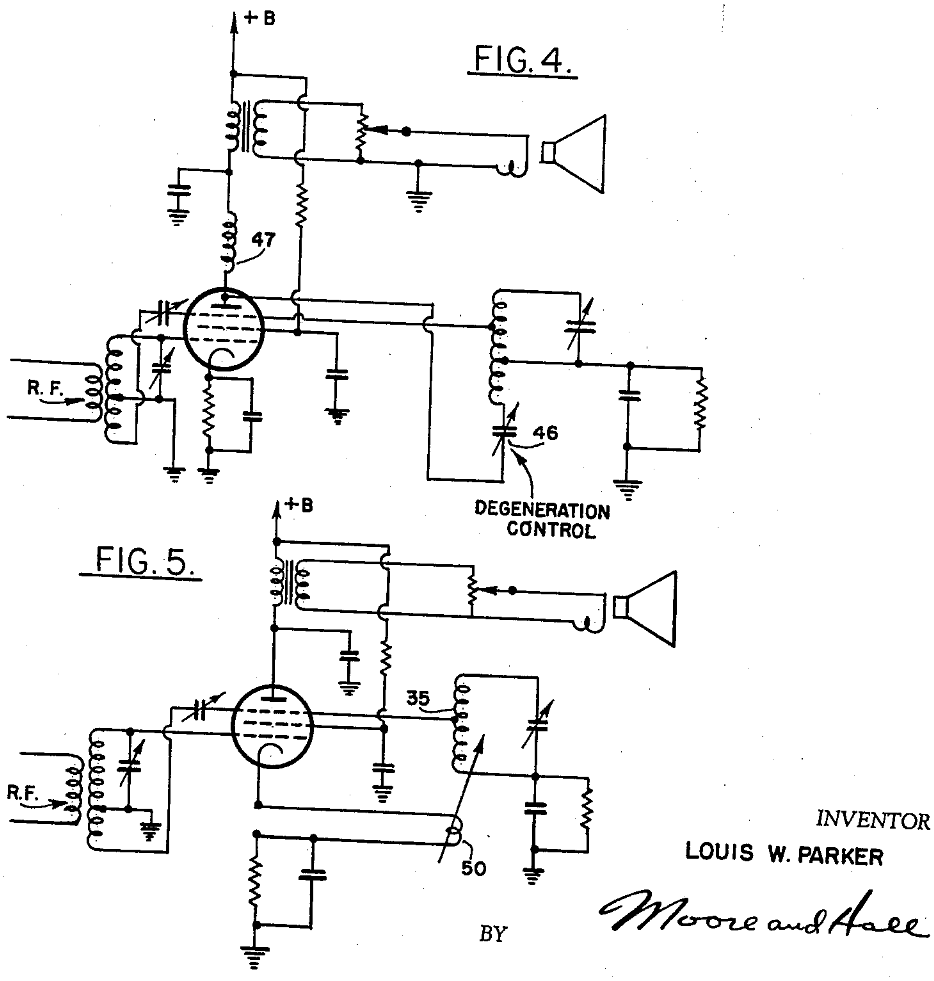
Figure 4 is a schematic diagram of still another modified form of the invention.
Figure 5 is a schematic diagram of yet another modified form of the invention.

Figure 4 illustrates an alternate arrangement in which degeneration is obtained by employing variable condenser 46 to effect partial neutralization between the plate and the quadrature grid. It has a slight constructional advantage over the device shown in Figure 1 in that it eliminates the moving coil. However, inductor 47 is normally employed in order to raise the radio frequency potential on the anode and thus effect ample regeneration.

Figure 5 illustrates an alternate way of boosting the radio frequency potential on the quadrature grid. In the other forms of the invention the quadrature grid not only receives radio frequency potential as a result of the space charge coupling, but due to inductive reactance in the anode lead the radio frequency potential on the anode is built up and transferred to the quadrature grid by reason of the capacity between the anode and that grid. In Figure 5 there is no inductance coil in the anode circuit but instead there is a coil 50 in series with the cathode which boosts the potential of the quadrature grid by inducing energy into coil 35. The cathode current which is the integral of the plate, screen and control grid currents is not nearly as much affected by the quadrature grid voltage variation as the plate current; nevertheless the cathode current is fully modulated by the radio frequency potential on the first grid and hence it is able to provide a considerable amount of booster signal to the coil 35 with only two or three turns of coupling.

The theory of operation of the devices of my invention may be explained with reference to Figure 1. There are two control grids 23 and 28 in the pentode 24. Both grids have the ability to start and stop the flow of electrons to the plate or anode 37. These grids are both biased at approximately their cut-off point, and hence the pentode is conducting only when the alternating current waves on both grids are simultaneously positive. When the radio frequency current applied to grid 23 is unmodulated the radio frequency potentials on the two grids are 90 degrees out of phase, this being by reason of the fact that the tuned circuit 35, 36 is excited both by space charge coupling with the electron stream, and energy fed back by the coupling between anode 37 and grid 28, and when the circuit 35, 36 is properly tuned as explained above, it will begin to oscillate 90 degrees out of phase with variations in the electron stream. As the 4.5 megacycle carrier impressed on grid 23 is frequency modulated the phase relation between the potentials on grids 23 and 28 will vary so as to be more or less than 90 degrees. If we assume for purposes of explanation the extreme condition (not obtainable in practice) that the potentials on the grids are 180 degrees apart, there is no time interval at which both grids allow electrons to pass, hence no current flows in the plate circuit. When the potentials on the grids are in phase (the other extreme condition), current flows throughout each positive half cycle. When the potentials on the grids are out of phase, but less than 180 degrees apart, the period of each half cycle that the pentode is conducting is in inverse relation to the phase relationship. Hence, there will be some plate current flow during each half cycle. These current surges will all have substantially the same amplitudes but their widths (time durations) will vary with the modulating signal. These surges or pulses occur at the rate of 4,500,000 per second and are therefore inaudible, except that the variations in their widths occur at audio rates and therefore vary the energy fed to the loudspeaker at audio rates after they have been integrated by condenser 39 and transformer 40. Hence, the intelligence impressed on the output signal is audible. In my prior copending application, S. N. 252,783, I increased the R. F. potential on the anode by adding inductive reactance in series with the anode of tube 24 and thereby increased the radio frequency potential on the suppressor by reason of the capacity between it and the anode. This was quite workable even without the use of degenerative feedback and improved the operation over that obtained without the use of inductive reactance in series with the anode but the extent of improvement was limited for the reason that if the inductance in series with the anode was very large it would create such a large feed-back from the anode to the grid as to produce self-sustained oscillations. Within operating limits it not only increased the quadrature grid potential but also increased the sharpness of resonance in circuit 35—36 and gave a greater output in response to small frequency deviations. With the present device I make the inductance of coil 38 considerably larger than in the prior application, in fact so large that in the absence of negative feed back it would cause regeneration sufficient to effect sustained oscillations in the system. Then I apply negative feed-back sufficient to prevent the circuit from oscillating. I have proved experimentally that this results in stable operation with a much higher audio output than has heretofore been possible.

Another improvement is the use of widely spaced grid wires on the quadrature grid. It is well known that such a low mu grid permits a far greater amount of the electrons to pass when the voltage on it is momentarily reduced to zero, than the normal higher mu grids. However, the mutual conductance of such grid is low (usually below 1000 micro-mhos) and the voltage generated by the passing electrons is also low. But with the method shown on Figure 1, I am able to feed back a high enough voltage to this grid of low effect, to fully modulate the electron stream. This voltage is in the order of 120 volts peak on the type 837 tube. Due to the widely spaced grid construction of this tube, I am able to get peak currents in the order of 150 milliamperes without the necessity of driving the grid positive.

Another important improvement caused by the low mu grid is the lowering of the tube plate impedance. Inasmuch as the audio frequency wave is created by the integration of the radio frequency pulses, the proper load impedance to match the tube plate circuit is much higher than the true plate impedance of the tube. This phenomenon finds an analogy in the art as for example the load resistance of a detector diode appears lower to the diode input than it is, provided of course that there is a condenser across the resistance to integrate the radio frequency pulses. It is very difficult and costly to make audio transformers of over 20,000 ohms, especially if there is strong direct current present. By using a low mu grid, such as found in the type 837 tube, a transformer impedance of 9,000 ohms will match the plate properly.

Still another improvement depends on the phenomenon that the screen and plate currents are in phase opposition. This is due to the fact that the total numper of electrons depend primarily on the first grid potential and the screen potential. The quadrature grid may block these electrons from entering the plate, but then they turn around and enter the screen. In this way low plate current results in high screen current and vice versa. By placing a resistance in series with the screen and a small condenser from screen to ground, I am able to convert these screen current variations into screen voltage variations. When there is need for high plate current the screen potential rises, assisting in this way the plate current. The result is an increase of up to 50% in output power.

Another way to make use of the phenomenon, that the plate and screen currents are in opposite phase is to feed them thru a push-pull audio frequency transformer as shown in Figure 3.

I have found that a higher value of undistorted power output is obtainable when I tune the suppressor resonant circuit slightly lower than the exact frequency of resonance. This is unconventional and is probably due to the fact, that when the tuned circuit connected to the quadrature grid is tuned to exact resonance with the center frequency of the frequency modulated signal, the instantaneous amplitude of this signal drops as the frequency deviates from the center. The reason is that the resonance curve has a comparatively sharp peak and as the frequency moves off this peak, the amplitude of the signal drops. On one half of the wave, this drop aids the discrimination process, on the other half, it is opposing it. By moving slightly off resonance, it is possible to increase the drop of the signal voltage when the frequency is deviated in one direction and to lessen the drop when deviated in the other direction. Therefore, by tuning slightly off resonance in one direction, the process of discrimination may be aided.

It is also noted that the feedback of radio frequency energy from any suitable part of the circuit to the suppressor, accomplishes the double purpose of increasing the radio frequency potential at the quadrature grid (permitting in this way a lower mu quadrature grid) and increasing the Q of the resonant circuit connected to the quadrature grid, which results in greater phase variation with a given frequency shift. This latter fact, of course, increases the audio output.

The cathode bias on pentode 24 is determined by resistor 27. When the peaks of the radio frequency wave are higher than the cathode bias, the first grid becomes positive momentarily, relative to the cathode.

This results in a grid current flow. The energy to maintain this current flow is obtained from the radio frequency wave and it can be considerable, even for a few volts of potential difference between the first grid and cathode. Inasmuch as the losses in high Q resonance circuit 25—26 are very low, the introduction of grid current flow brings about a substantial increase in these losses which effectively prevent the build up of R. F. voltage above the value where the peaks exceed the cathode bias.

Under normal operation, there is always a little grid current, such as 1 milliampere. With even a slight increase of input power, this current increases rapidly, lowering thereby the Q of resonance circuit 25—26.

When grid 23 becomes positive it increases the flow of electrons some of which are added to the grid current but most of which are added to the anode and screen current. Hence, the increase in grid potential serves the double purpose of supplying grid current to effect limiting, and increasing the anode current.

An additional factor which improves the limiting action is the circuit of the quadrature grid. This circuit uses grid leak bias (in addition to slight amount of cathode bias) and an increase of peak plate current raises the R. F. voltage across resonance circuit 35—36 which promptly increases the bias across grid leak 34. The net result is a reduction in the width of the "wave" or "pulse" passed by the quadrature grid, which reduces the A. F. output by a slight amount. In this way the slight imperfection in limiting of the first grid is compensated for by the third grid.

It is noted that I am able to perform the limiting, discriminating and amplifying all in a single stage by reason of my new circuit arrangement. However, it would be within the scope of the broadest aspects of my invention to use two tubes for tube 24. In such case the control grid 23 would be in the first tube, and the anode of the first tube would feed the cathode of the second tube which would be controlled by grid 28.

In order to help those who desire to reproduce the results that I have obtained, I am setting forth the values of the component parts of the circuit that I used. With a type 837 tube having the base pin of the third grid removed (as previously mentioned) the following values were employed for the components shown in Figure 1:

| | |
|---|---|
| Coil **21** | 100 microhenries. |
| Coil **25** | (Above the tap) 38 microhenries. |
| Coil **25** | (Below the tap) 17 microhenries. |
| Coil **35** | 44 microhenries. |
| Coil **38** | 11 microhenries. |
| Condenser **29** | 5 micro microfarads. |
| Condenser **30** | 0.005 microfarad. |
| Condenser **31** | 100 microfarads. |
| Condenser **33** | 0.005 microfarad. |
| Condenser **36** | 15 micro-microfarads. |
| Condenser **39** | 0.01 microfarad. |
| Resistor **27** | 400 ohms. |
| Resistor **32** | 4000 ohms. |
| Resistor **34** | 1.0 megohm. |

The D. C. plate potential was 350 volts, the D. C. potential on the first grid—20 volts, on the second grid 220 volts, and on the third grid—120 volts, in addition to the 20 volt cathode bias. The plate current was 25 milliamperes, the current on the first grid was 0.9 milliampere, and the current on the second grid was 27 milliamperes. The carrier frequency fed to coil 21 was 4.5 megacycles, the frequency deviation was 20 kilocycles, and the capacity of condenser 26 was correct to tune its resonant circuit to 4.5 megacycles. The power output resulting from the above circuit was 1.2 watts at 400 cycles.

I claim to have invented:

1. A television receiver for receiving signals in a television signal band including an amplitude modulated image carrier and a related frequency modulated sound carrier spaced a substantially fixed frequency from the picture carrier, said receiver comprising means to select and amplify one such band of frequency so that the amplitude of the sound carrier will be less than the amplitude of the image carrier at the maximum modulation of that carrier by the picture or image signal, means for heterodyning said carriers to produce a new carrier having a frequency equal to the frequency spacing of the image and sound carriers and for amplitude detecting the image carrier to produce image signals, the last-named means including a final amplifier for the video signals and the new carrier, a cathode ray tube having a grid, a filter connecting said final amplifier to said grid and tuned to reject the new carrier and to pass the video signals, a series resonant circuit in the output of said final amplifier tuned to pass the new carrier, said series resonant circuit including an inductive means acting as a transformer primary, a secondary coil losely coupled with said primary, a condenser tuning said secondary to the frequency of said new carrier, a pentode having a cathode, an anode, and first, second and third grids positioned between the cathode and the anode in the order named, means connecting at least a part of said secondary between said cathode and said first grid, a resonant circuit tuned approximately to the mean frequency of said new carrier and connected to and excited by said third grid, an output circuit including an inductor connected in series with said anode and said cathode, the anode and third grid being spaced close enough so that there is regeneration in the form of capacitive feed-back from the anode to the third grid, and means for biasing said second grid and said anode positively with respect to said cathode.

2. A discriminator for demodulating a time modulated high frequency signal comprising an electron discharge device having a cathode, an anode, and first, second and third grids intermediate said cathode and said anode, said first grid being nearer said cathode than the other two of said grids and said third grid being nearer said anode than the other two of said grids, means for feeding said signal to be demodulated onto said first grid, a resonant circuit tuned to a frequency within the frequency band of said signal and coupled to and excited by coupling between said third grid and the electron stream and said anode, an output circuit including an inductor connected in series with said anode, said inductor having an inductance value sufficient to cause said discriminator to generate self-oscillations in the absence of negative feed back and said output circuit being coupled to said resonant circuit in a degenerative sense for feeding signal energy from said output circuit to said resonant circuit in such phase and of such amplitude as to prevent said oscillations.

3. A discriminator for demodulating a frequency modulated high frequency signal comprising a pentode having a cathode, first, second and third grids and an anode, said grids being positioned between the cathode and the anode in the order named, an input circuit connected to said first grid for feeding said signal to the first grid, means applying a positive bias to the second grid, a resonant circuit tuned to a frequency within the frequency band of said signal and connected to and excited by the potential on the third grid, an output circuit including an inductor connected in series with said cathode and said anode, and means coupling said output circuit to one of the two first-mentioned circuits in a degenerative sense for preventing oscillations in the pentode, said anode and said third grid being so related that the capacity between them would cause the generation of self-oscillations in the absence of the last-named means.

4. A discriminator as defined in claim 3 in which said resonant circuit comprises a coil coupled to and receiving negative feedback energy from said inductor for preventing said oscillations.

5. A discriminator as defined in claim 3 in which the oscillation preventing means comprises a condenser connected between the output circuit and the resonant circuit.

6. A frequency discriminator for demodulating a frequency modulated high frequency signal comprising a pentode having a cathode, an anode, and first, second and third grids positioned between the cathode and the anode in the order named, an output circuit including the cathode and the anode and means for applying a positive bias to said anode, means for applying said signal to the first grid, means for applying positive bias to the second grid of lower value than the anode potential, a resonant circuit connected to and excited by the potential on the third grid, said resonant circuit being tuned approximately to the mean frequency of said signal means and being coupled to said output circuit for effecting negative feedback from the output circuit to said resonant circuit, and inductor means in series with the anode having an inductance value which will cause regenerative feedback between said anode and said third grid in an amount sufficient to effect the generation of self-oscillations in the discriminator in the absence of said negative feedback.

7. A frequency discriminator as defined in claim 6 wherein said third grid comprises widely spaced conductors.

8. A discriminator as defined in claim 1 wherein said means for biasing said second grid comprises a load resistor connected to said second grid, and further comprising a by-pass condenser connected from the second grid to ground, said condenser having sufficient capacity to by-pass substantially all of the radio frequency potential appearing on the second grid, but insufficient capacity to by-pass the demodulated signal energy.

9. A combined limiter, discriminator and amplifier stage for a frequency modulated radio frequency carrier comprising a pentode having a cathode, first, second and third grids and an anode, a tuned circuit tuned to the mean frequency of said carrier and connected to said cathode and said first grid for applying radio frequency energy between the cathode and first grid, a resonant circuit tuned to the mean frequency of said carrier and connected to the third grid to be excited by coupling of said third grid with the electron stream and said anode, means for applying positive bias to the second grid, an output circuit including a reactor connected to said anode for effecting substantial regenerative feedback of the radio frequency carrier energy in the output circuit to the third grid, and means for biasing said anode positively with respect to said cathode.

10. A discriminator for demodulating a frequency modulated, high frequency carrier comprising electron discharge means including a cathode, first, second and third control electrodes and an anode, said first electrode being nearer said cathode than said second electrode and said third electrode being between said second electrode and said anode, means for applying said carrier to said first electrode, a resonant circuit tuned approximately to the mean frequency of said carrier coupled to said third electrode, and an output circuit connected between said anode and said cathode, said output circuit being coupled to said resonant circuit in both a regenerative sense and a degenerative sense, the amount of regenerative feedback being sufficient in the absence of the degenerative feedback to cause said discriminator to generate self-oscillations.

11. A discriminator for demodulating a frequency modulated, high frequency carrier comprising electron discharge means including a cathode, first, second and third control electrodes and an anode, said first electrode being nearer said cathode than said second electrode and said third electrode being between said second electrode and said anode, an input circuit coupled to said first electrode for supplying said carrier to said first electrode, a resonant circuit separate from said input circuit and tuned approximately to the mean frequency of said carrier coupled to said third electrode, means for biasing said anode and said second electrode positively with respect to said cathode, and an output circuit including an inductor having inductive reactance at the frequency of said carrier connected between said anode and said biasing means and coupled to said resonant circuit in a regenerative sense at the frequency of said carrier, the amount of regenerative feedback being less than that required to cause said discriminator to generate oscillations.

12. A discriminator for demodulating a time modulated, high frequency carrier comprising electron discharge means including a cathode, first, second and third control electrodes and an anode, said first electrode being nearer said cathode than said second electrode, and said third electrode being between said second electrode and said anode, an input circuit coupled to said first electrode for supplying said carrier to said first electrode, a resonant circuit separate from said input circuit and tuned approximately to the mean frequency of said carrier coupled to said third electrode, means for biasing said anode and said second electrode positively with respect to said cathode, and an output circuit connected between said anode and said biasing means, said output circuit being coupled to one of said first-mentioned circuits in a regenerative sense at the frequency of said carrier, the amount of regenerative feedback being less than that required to cause said discriminator to generate self-oscillations.

13. Means for demodulating a frequency modulated, high frequency signal comprising an electron discharge device having a cathode, an anode, a pair of control electrodes and a further electrode, an input circuit connected between one of said control electrodes and said cathode for supplying said signal to said one electrode, means for applying a positive bias potential to said further electrode, an output circuit connected between said anode and said cathode and a quadrature circuit connected to the other of said control electrodes, said quadrature circuit being coupled to one of said input and said output circuits for energizing said other control electrode in phase quadrature with said signal at a predetermined frequency within the frequency band of said signal, one of said circuits being coupled to another of said circuits in a degenerative sense at a predetermined frequency in said band and one of said circuits being coupled to another of said circuits in a regenerative sense at a predetermined frequency in said band, the coupling between said last-mentioned one circuit and said last-mentioned other circuit being sufficient in the absence of the coupling in a degenerative sense to produce sustained oscillations.

14. A receiver for receiving television signals in a predetermined frequency band including an amplitude modulated image carrier and a related frequency modulated sound carrier spaced by a substantially fixed frequency difference from said image carrier comprising means for amplifying said signals in said band, means for heterodyning said carriers to produce a new carrier having a frequency equal to said frequency difference and being frequency modulated the same as said sound carrier and for demodulating said image carrier, a cathode ray tube having a control electrode, means to apply the demodulated image signal to said control electrode, a series-resonant peaking circuit connected to said heterodyning means and tuned to resonate at said new carrier frequency, a frequency discriminator comprising an electron discharge device having a cathode, a first control grid, an accelerating grid, a second control grid and an anode, all arranged in the order named, means to apply input signal voltage from said peaking circuit to said first control grid, means to apply positive biasing potential to said accelerating grid, a resonant circuit tuned approximately to the frequency of said new carrier and connected to said second control grid and cathode, to be excited at signal frequency by space charge coupling with the electron stream, an output circuit in series with said cathode and anode including inductance means connected to said anode, to cause positive high frequency feed-back upon said resonant circuit via the inherent capacity between said anode and said second control grid, the inductance value of said inductance means being such that in the absence of negative feed-back self-oscillations will result in said discriminator, said output circuit being coupled to said resonant circuit for feeding signals from said output circuit to said resonant circuit in a phase and amplitude which will prevent said sustained oscillations, and means to derive demodulated audio signal energy from said output circuit.

15. A television receiver as claimed in claim 14, including means for biasing both said control electrodes in the region of cut-off bias.

16. A television receiver as claimed in claim 14, including a load resistor and bypass condenser, connected to said accelerating grid, said bypass condenser having a value sufficient to bypass said accelerating grid for radio frequency energy but insufficient to bypass the audio frequency signal.

17. A discriminator for demodulating a frequency modulated radio signal comprising an electron discharge device having a cathode, a first control grid, an accelerating grid, a second control grid and an anode, all arranged in the order named, means for applying a signal to be demodulated to said first control grid, means to apply positive biasing potential to said accelerating grid, a resonant circuit tuned to a frequency within the frequency band of said signal and connected to said second control grid and cathode, to be excited at signal frequency by coupling of the second grid with the electron stream and the anode, an output circuit connected in series with said cathode and anode including anode potential supply means and inductance means connected to said anode, to cause positive radio frequency feed-back upon said resonant circuit through the inherent capacity between said anode and said second control grid, the reactance of said inductance means being such that in the absence of negative feedback self-oscillations will result in said resonant circuit, further means to cause oscillation-preventing negative feedback from said output circuit upon said resonant circuit, and means to derive demodulated signal energy from said output circuit.

18. A discriminator for demodulating a frequency modulated high frequency signal comprising electron discharge means having a cathode, first, second and third control electrodes and an anode, an input circuit connected to said first control electrode for applying said signal thereto, a resonant circuit tuned to a frequency within the frequency band of said signal and connected to said third control electrode to be excited by space charge coupling said third electrode with the electron stream and by capacity coupling between said anode and said third electrode, an output circuit connected to said anode comprising a coil connected in series with said anode and coupled to said resonant circuit, an output transformer having a tapped primary winding, a source of positive D. C. potential connected to the tap on said primary winding, one end of said primary winding being connected to the end of said coil opposite to the end thereof connected to said anode and the other end of said coil being connected to said second electrode.

19. A discriminator for demodulating a radio frequency signal modulated according to a lower frequency modulating signal comprising an electron discharge device having a cathode, a first control grid, an accelerating grid, a second control grid and an anode, all arranged in the order named, an output circuit including a coil and steady anode potential supply means connected to said anode, input circuit means connected to said first grid for applying input signal potential to be demodulated to said first control grid, means to apply positive bias potential to said accelerating grid, a resonant circuit separate from said input circuit means and having a resonating frequency approximately equal to the undeviated carrier frequency of said signal and connected to said second control grid and cathode, to be excited at signal frequency and varying phase by coupling between said second grid and the electron stream and said anode in proportion to the frequency deviations of said input signal, to cause anode current fluctuations according to said modulating frequency, means including a series resistor connected to said accelerating grid for supplying a positive biasing potential to said accelerating grid, a by-pass condenser connected between said accelerating grid and ground, said by-pass condenser having a capacity sufficient to by-pass radio frequency energy but insufficient to by-pass the demodulated signal frequency, and means to derive demodulated signal energy from said device.

20. The combination of claim 18 including a by-pass condenser connected from said second control electrode to ground, said condenser having sufficient capacity to by-pass substantially all of said high frequency signal appearing on said second control electrode, but insufficient capacity to by-pass the demodulated signal frequency.

21. The combination of claim 19 including means for applying regenerative feedback between said anode and said second control grid.

References Cited in the file of this patent

UNITED STATES PATENTS

| | | |
|---|---|---|
| 1,791,435 | Thompson | Feb. 3, 1931 |
| 1,876,841 | Black | Sept. 13, 1932 |
| 2,045,700 | Dalpayrat | June 30, 1936 |
| 2,097,765 | Klotz | Nov. 2, 1937 |
| 2,218,902 | Blumlein | Oct. 22, 1940 |
| 2,231,374 | Stillwell | Feb. 11, 1941 |
| 2,248,797 | Waller | July 8, 1941 |
| 2,610,261 | Wofford | Sept. 9, 1952 |
| 2,652,447 | Crosby | Sept. 15, 1953 |

FOREIGN PATENTS

| | | |
|---|---|---|
| 409,915 | Great Britain | May 10, 1934 |

OTHER REFERENCES

Dilson, Intercarrier Televisers Use Common I. F. Channels: Radio-Electronics, September 1949, pages 30 and 31.